US008312415B2

(12) United States Patent
Marius et al.

(10) Patent No.: US 8,312,415 B2
(45) Date of Patent: Nov. 13, 2012

(54) USING CODE ANALYSIS FOR REQUIREMENTS MANAGEMENT

(75) Inventors: Gabriel Marius, Kirkland, WA (US); Sean Sandys, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1246 days.

(21) Appl. No.: 11/787,884

(22) Filed: Apr. 17, 2007

(65) Prior Publication Data
US 2008/0263504 A1  Oct. 23, 2008

(51) Int. Cl.
*G06F 9/44* (2006.01)
(52) U.S. Cl. .................. 717/101; 717/100; 717/102
(58) Field of Classification Search .................. None
See application file for complete search history.

(56) References Cited

U.S. PATENT DOCUMENTS

| | | | |
|---|---|---|---|
| 4,751,635 A | 6/1988 | Kret | |
| 5,522,036 A | 5/1996 | Shapiro | |
| 6,164,841 A | 12/2000 | Mattson, Jr. et al. | |
| 6,226,784 B1 | 5/2001 | Holmes et al. | |
| 6,256,773 B1 * | 7/2001 | Bowman-Amuah | 717/121 |
| 6,336,217 B1 * | 1/2002 | D'Anjou et al. | 717/121 |
| 6,415,396 B1 | 7/2002 | Singh et al. | |
| 6,757,893 B1 * | 6/2004 | Haikin | 717/170 |
| 7,228,524 B2 * | 6/2007 | Bailey et al. | 717/100 |
| 7,596,778 B2 * | 9/2009 | Kolawa et al. | 717/126 |
| 2003/0009740 A1 * | 1/2003 | Lan | 717/102 |
| 2003/0018952 A1 * | 1/2003 | Roetzheim | 717/101 |
| 2003/0033590 A1 * | 2/2003 | Leherbauer | 717/122 |
| 2003/0188290 A1 * | 10/2003 | Corral | 717/101 |
| 2004/0064805 A1 * | 4/2004 | Sparago et al. | 717/120 |
| 2004/0068713 A1 * | 4/2004 | Yannakoyorgos et al. | 717/101 |
| 2004/0088687 A1 | 5/2004 | Dalton et al. | |
| 2004/0123272 A1 * | 6/2004 | Bailey et al. | 717/125 |
| 2004/0230964 A1 * | 11/2004 | Waugh et al. | 717/168 |
| 2005/0015675 A1 * | 1/2005 | Kolawa et al. | 714/38 |
| 2005/0114829 A1 * | 5/2005 | Robin et al. | 717/101 |
| 2005/0216879 A1 * | 9/2005 | Ruhe | 717/101 |
| 2005/0216890 A1 * | 9/2005 | Sundararajan et al. | 717/120 |
| 2006/0101443 A1 * | 5/2006 | Nasr | 717/163 |
| 2006/0190922 A1 | 8/2006 | Chen | |
| 2006/0282816 A1 | 12/2006 | Chen | |
| 2007/0038977 A1 | 2/2007 | Savage | |
| 2007/0168910 A1 * | 7/2007 | Radford et al. | 717/101 |

(Continued)

OTHER PUBLICATIONS

Annie T.T. Ying et al, "Predicting Source Code Changes by Mining Change History", IEEE Sep. 2004, pp. 574-586, <http://ieeexplore.ieee.org/stamp/stamp.jsp?tp=&arnumber=1324645>.*

(Continued)

*Primary Examiner* — Thuy Dao
*Assistant Examiner* — Cuong V Luu

(57) ABSTRACT

Various technologies and techniques are disclosed that allow project requirements to be associated with underlying code elements. A particular software project is analyzed to generate a list of code elements contained in the particular software project. Input is received from a user of a requirements management application to associate one or more project requirements to one or more of the code elements. The project requirements and an association with the one or more code elements are stored in a data store for later retrieval. These associations are used to determine when changes that potentially affect the project requirement are made to the underlying code elements. A software development application is operable to interact with the data store and provide a notice to a user of the software development application that a change to a particular code element of the software project will impact one or more project requirements.

20 Claims, 15 Drawing Sheets

U.S. PATENT DOCUMENTS

2007/0168918 A1* 7/2007 Metherall et al. ............. 717/101
2008/0263505 A1* 10/2008 StClair et al. ................. 717/101

OTHER PUBLICATIONS

Kurt R. Linberg, Software developer perceptions about software project failure: a case study:, The Journal of Systems and Software 49, 1999 pp. 177-192, <http://ac.els-cdn.com/S0164121299000941>.*

Robert W. Zmud, "Management of Large Software Development Efforts", MIS Quarterly, vol. 4, No. 2, Jun. 1980, pp. 45-55, <http://www.jstor.org/stable/pdfplus/249336.pdf?acceptTC=true>.*

Andrew P. Snow et al, "The Challenge of Accurate Software Project Status Reporting: A Two-Stage Model Incorporating Status Errors and Reporting Bias", IEEE Nov. 2002, pp. 491-504, <http://ieeexplore.ieee.org/stamp/stamp.jsp?tp=&arnumber=1176874>.*

Aaron J. Shenhar, "From Theory to Practice: Toward a Typology of Project-Management Styles", IEEE Feb. 1998, pp. 33-48 , <http://ieeexplore.ieee.org/stamp/stamp.jsp?tp=&arnumber=658659>.*

Nazim H. Madhavji, "Environment Evolution: The Prism Model of Changes", IEEE May 1992, pp. 380-392, <http://ieeexplore.ieee.org/stamp/stamp.jsp?tp=&arnumber=135771>.*

International Search Report and Written Opinion Received for PCT Application No. PCT/US2008/057371, mailed on Jul. 28, 2008, 10 pages.

Zagajsek, et al., "Requirement Management Process Model for Software Development Based on Legacy System", In 9th International Conference on Telecommunications—ConTel 2007, Jun. 13-15, 2007, pp. 115-122.

Barber, et al., "Requirements Evolution and Reuse Using the Systems Engineering Process Activities (SEPA)", http://www-lips.ece.utexas.edu/pubs/journals/1999/AJIS/AJIS-UTAustin_final.pdf, 5 pages.

Greevy, e al., "Correlating Features and Code Using a Compact Two-Sided Trace Analysis Approach", Date: 2005, http://www.iam.unibe.ch/~sco/Archive/Papers/Gree05aTraceScraperCSMR2005Features, 11 pages.

Briand, et al. "Impact Analysis and Change Management of UML Models," <http://squall.sce.carleton.ca/pubs/tech_report/TR_SCE-03-01.pdf>, Feb. 2003, 125 pages.

Ahn, et al., "A Feature-Oriented Requirements Tracing Method: A Study of Cost-benefit Analysis.", International Conference on Hybrid Information Technology, 2006, 6 pages.

* cited by examiner

US 8,312,415 B2

USING CODE ANALYSIS FOR REQUIREMENTS MANAGEMENT

BACKGROUND

In modern software development, project managers typically gather, communicate, and manage the project requirements in order to help ensure the software project completes successfully. Requirements are best described as those attributes or behaviors that a software project should exhibit when completed (e.g. the solution should process 300 transactions per second, the solution should have only green buttons, the solution should have these screens, etc.). To a large extent, the success or failure of a software project is measured by the customer on how well that project has met its requirements.

Requirements management systems have been created, in part, to help ease the difficulty in communicating and managing requirements. Such systems allow a user to enter requirements and describe what parts of the software project those requirements go with. The requirements are not static, and evolve over time as the software project further develops. As these requirements evolve over time, it is difficult to determine the impact the changes in requirements have on the actual underlying software project.

SUMMARY

Various technologies and techniques are disclosed that allow project requirements to be associated with underlying code elements. A particular software project is analyzed to generate a list of code elements contained in the particular software project. Input is received from a user of a requirements management application to associate one or more project requirements to one or more of the code elements. The project requirements and an association with the one or more code elements are stored in a data store for later retrieval. These associations are used to determine when changes that potentially affect the project requirement are made to the underlying code elements. In one implementation, a user of the requirements management application can view a list of the requirements that may have been impacted and/or violated.

A software development application is operable to interact with the data store and provide a notice to a user of the software development application that a change to a particular code element of the software project will impact one or more project requirements. In one implementation, the notice indicates that a change to the code elements may affect whether the particular requirement is met or not. In another implementation, the change to the code element is actually compared to the requirement and the user is warned if that change violates the requirement.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
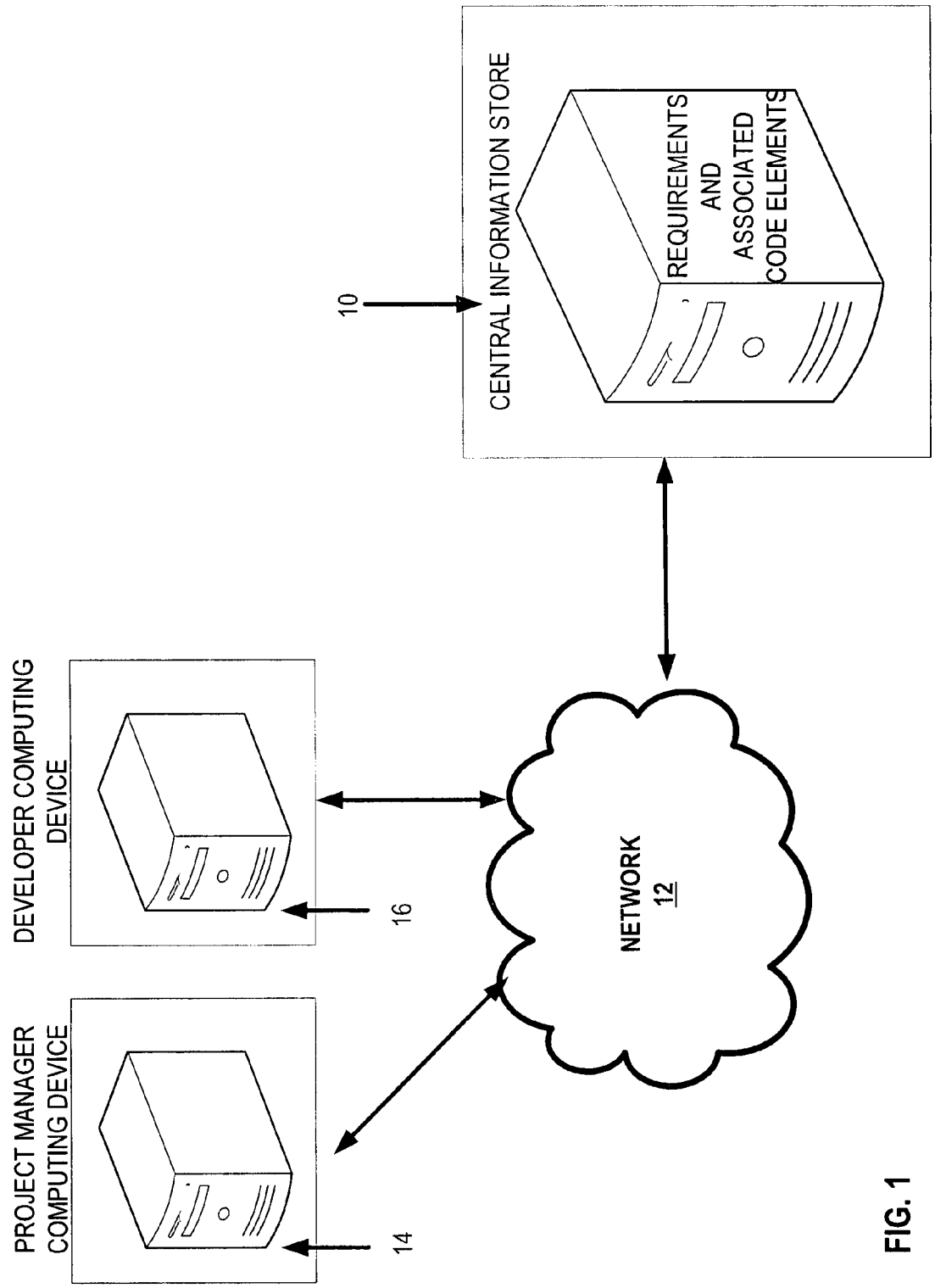
FIG. 1 is a diagrammatic view of requirements management system using a central information store, in one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that allows project requirements to be linked to underlying code elements, but the system also serves other purposes in addition to these. In one implementation, one or more of the techniques described herein can be implemented as features within a software development program such as MICROSOFT® VISUAL STUDIO®, from project management applications, and/or from any other type of program or service that modifies project requirements and/or the underlying code elements that those requirements are associated with.

In one implementation, a system is provided that allows project managers or other users to associate project requirements directly with the underlying code elements they represent. Then, as those underlying code elements actually change, the user of the project management application and/or the software development application can be notified that changes to the underlying code may impact those requirements and/or have actually violated those requirements.

As shown in FIG. 1, an exemplary computer system to use for implementing one or more parts of the system includes some number of project manager computing devices 14, some number of developer computing devices 16, a network 12, and an information store 10. Project manager computing devices 14 are computers that are used by project managers for the purpose of managing software application development efforts. Developer computing devices 16 are computers that are used by software developers for the purpose of writing software applications. Central information store 12 is one or more computers that store data and allows other network aware resources to access that data. Network 12 is used to provide communication between project manager computing device 14, developer computing device 16, and central information store 10. While the example shown in FIG. 1 illustrates project manager computing device 14, developer computing device 16, and central information store 10 being on separate computers, it will be appreciated that some, or all of these features may be performed on a single computer. For example, a software developer may also be the project manager, and may have both tools locally installed on one computer. In such an example, the software development program, the project management application, and/or the central information store may all be located on the same computer. Numerous other computer variations are also possible as would occur to one of ordinary skill in the computer software art.

Figure 2:
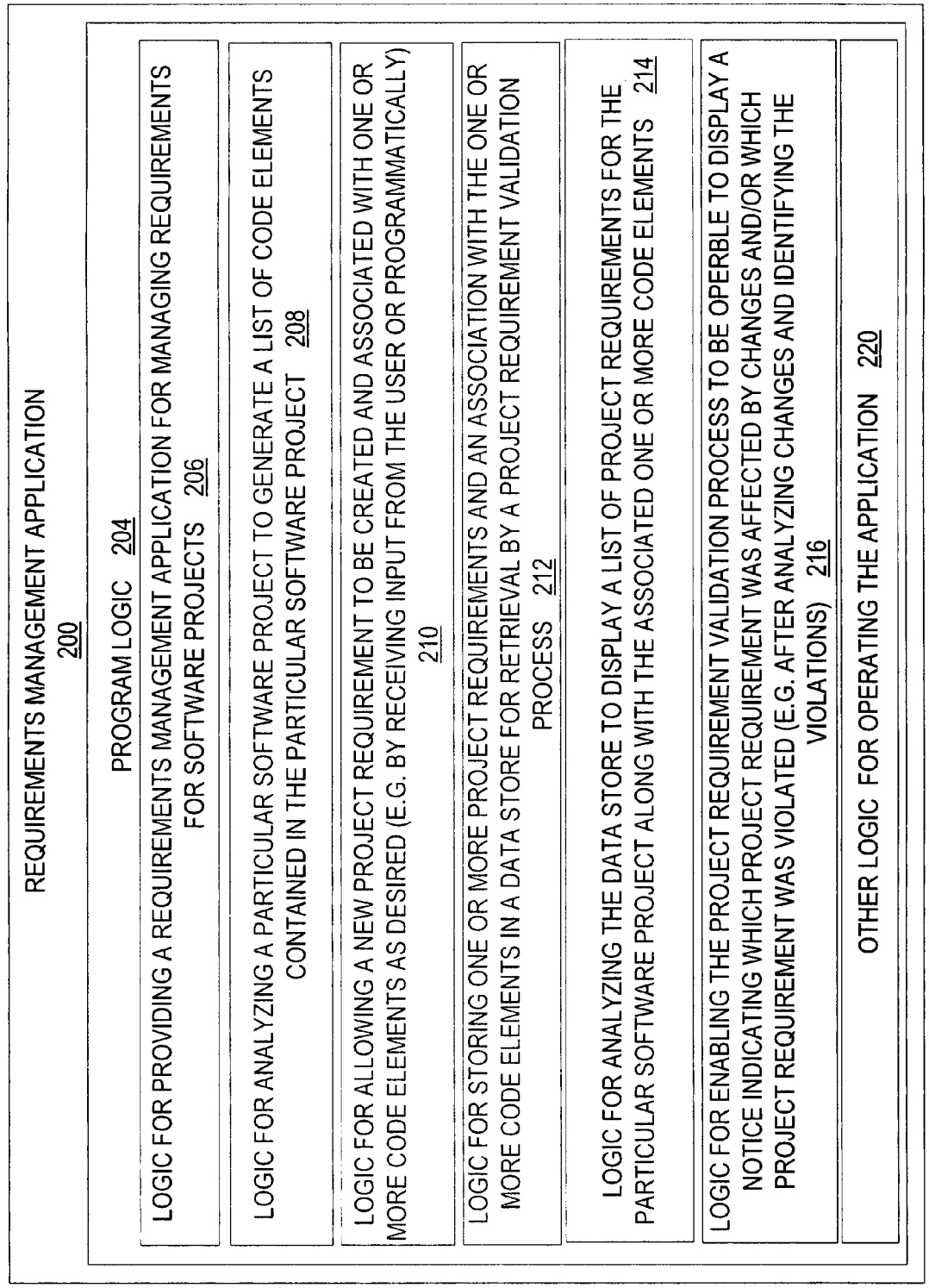
FIG. 2 is a diagrammatic view of a requirements management application of one implementation.
Figure 15:
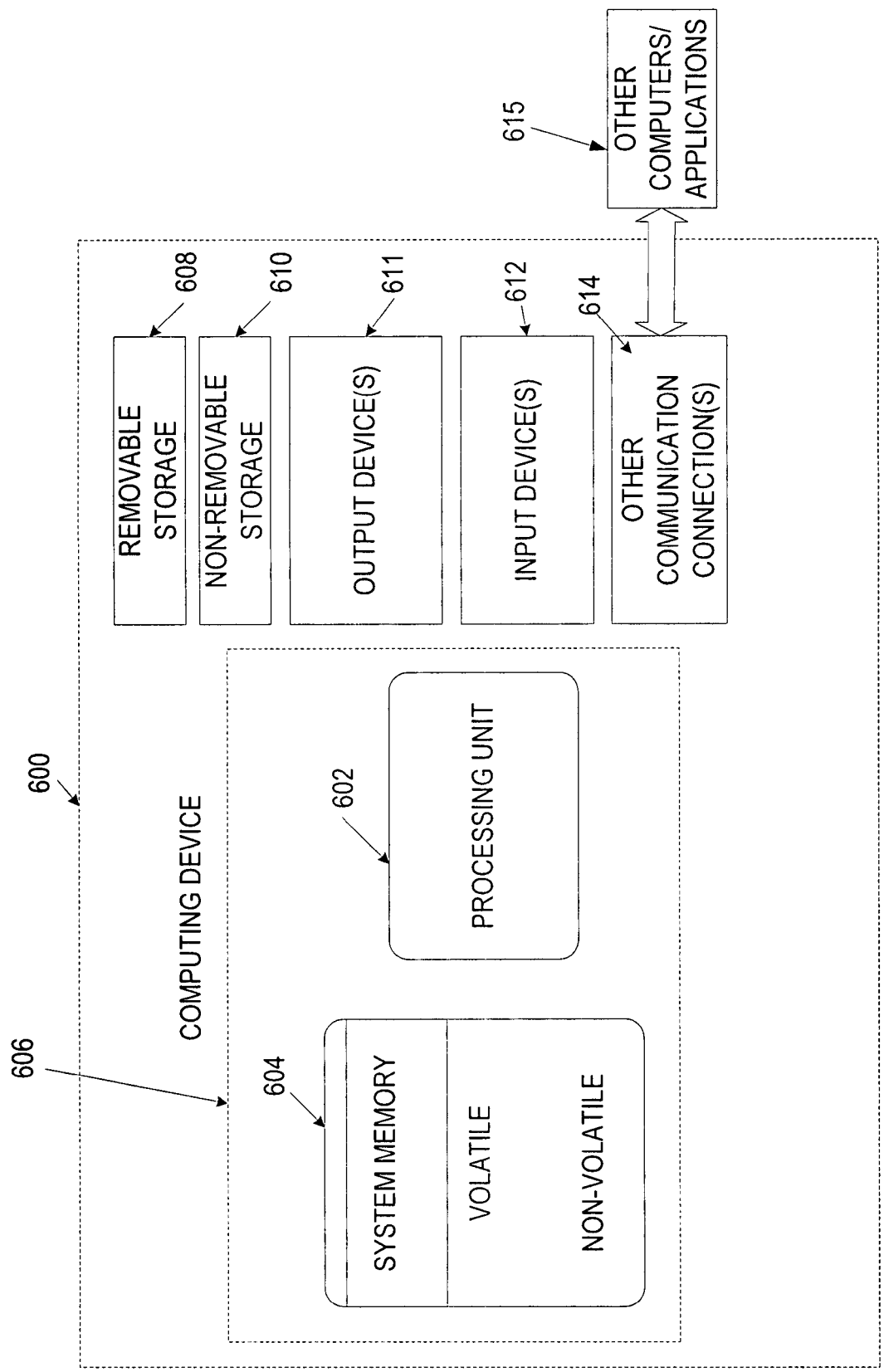
FIG. 15 is a diagrammatic view of a computer system that can perform some or all of the techniques discussed in FIGS. 1-14.

Turning now to FIG. 2, requirements management application 200 is one of the application programs that can reside on computing device 600 (of FIG. 15). However, it will be understood that requirements management application 200 can alternatively or additionally be embodied as computer-executable instructions on one or more computers and/or in different variations. Alternatively or additionally, one or more parts of requirements management application 200 can be part of system memory 604 (of FIG. 15), on other computers and/or applications 615 (of FIG. 15), or other such variations as would occur to one in the computer software art.

Requirements management application 200 includes program logic 204, which is responsible for carrying out some or all of the techniques described herein. Program logic 204 includes logic for providing a requirements management application for managing requirements for software projects 206; logic for analyzing a particular software project to generate a list of code elements contained in the particular software project 208; logic for allowing a new project requirement to be created and associated with one or more code elements as desired (e.g. by receiving input from the user or programmatically) 210; logic for storing one or more project requirements and an association with the one or more code elements in a data store for retrieval by a project requirement validation process 212; logic for analyzing the data store to display a list of project requirements for the particular software project along with the associated one or more code elements 214; logic for enabling the project requirement validation process to be operable to display a notice indicating which project requirement was affected by changes and/or which project requirement was violated (e.g. after analyzing changes and identifying the violations) 216; and other logic for operating the application 220. In one implementation, program logic 204 is operable to be called programmatically from another program, such as using a single call to a procedure in program logic 204.

Figure 3:
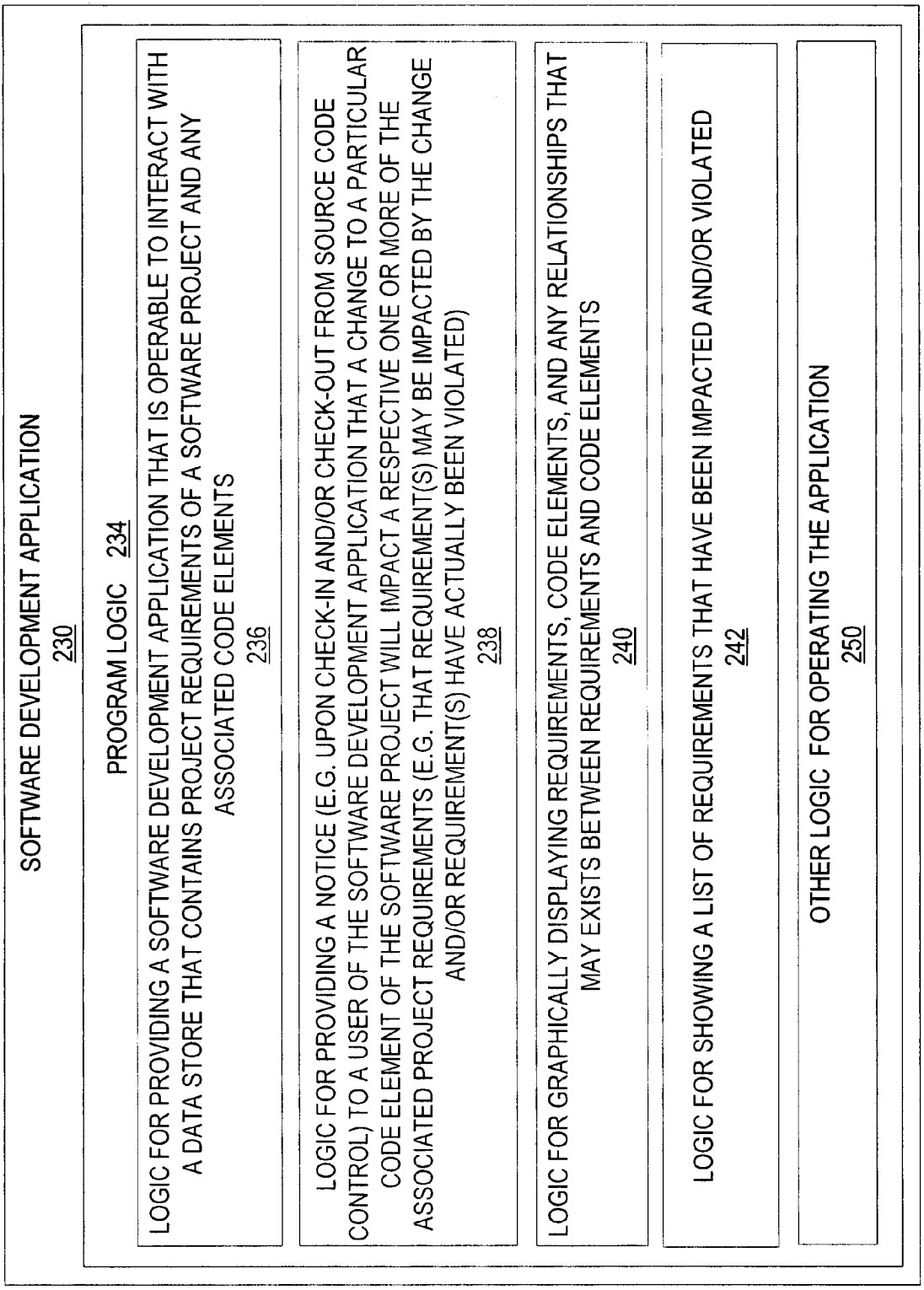
FIG. 3 is a diagrammatic view of a software development application of one implementation.

Turning now to FIG. 3, software development application 230 is one of the application programs that can reside on computing device 600 (of FIG. 15). However, it will be understood that software development application 230 can alternatively or additionally be embodied as computer-executable instructions on one or more computers and/or in different variations. Alternatively or additionally, one or more parts of software development application 200 can be part of system memory 604 (of FIG. 15), on other computers and/or applications 615 (of FIG. 15), or other such variations as would occur to one in the computer software art.

Software development application 230 includes program logic 234, which is responsible for carrying out some or all of the techniques described herein. Program logic 234 includes logic for providing a software development application that is operable to interact with a data store that contains project requirements of a software project and any associated code elements 236; logic for providing a notice (e.g. upon check-in and/or check-out from the source code control, etc.) to a user of the software development application that a change to a particular code element of the software project will impact a respective one or more of the associated project requirements (e.g. that requirement(s) may be impacted by the change and/or requirement(s) have actually been violated) 238; logic for graphically displaying requirements, code elements, and any relationships that may exist between requirements and code elements 240; logic for showing a list of requirements that have been impacted and/or violated 242; and other logic for operating the application 250. In one implementation, program logic 234 is operable to be called programmatically from another program, such as using a single call to a procedure in program logic 234.

Figure 4:
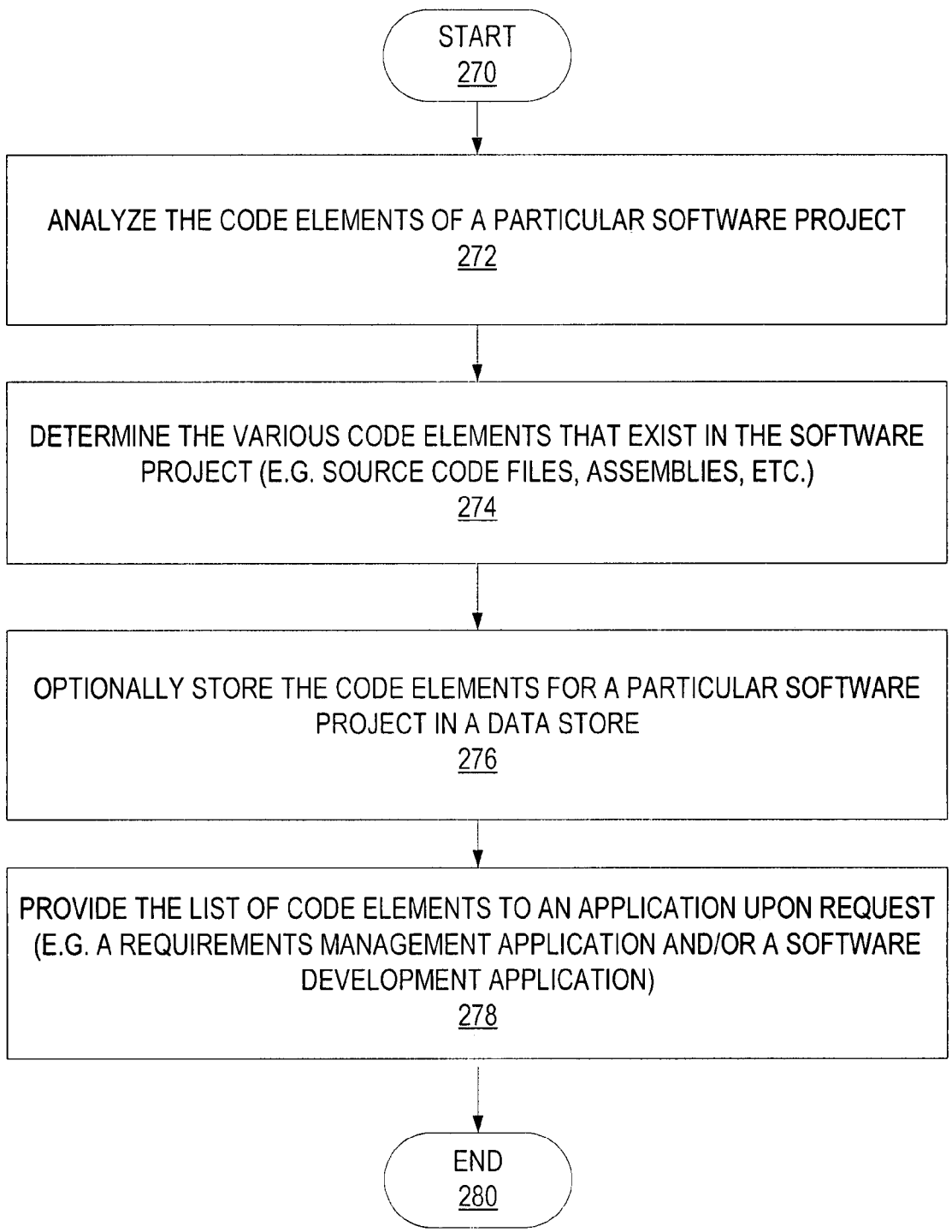
FIG. 4 is a process flow diagram for one implementation of the system of FIG. 1 illustrating the stages involved in analyzing a software project to obtain a list of code elements.

Turning now to FIGS. 4-10 with continued reference to FIGS. 1-3, the stages for implementing one or more implementations of the system are described in further detail. FIG. 4 illustrates one implementation of the stages involved in analyzing a software project to obtain a list of code elements. In one form, the process of FIG. 4 is at least partially implemented in the operating logic of computing device 600 (of FIG. 15). The process begins at start point 270 with analyzing the code elements of a particular software project (stage 272). The system determines the various code elements that exist in the software project (e.g. source code files, images, assemblies, etc.) (stage 274). The code elements for a particular software project are optionally stored in a data store (stage 276). The list of code elements is provided to an application upon request (e.g. a requirements management application and/or a software development application) (stage 278). The process ends at end point 280.

Figure 5:
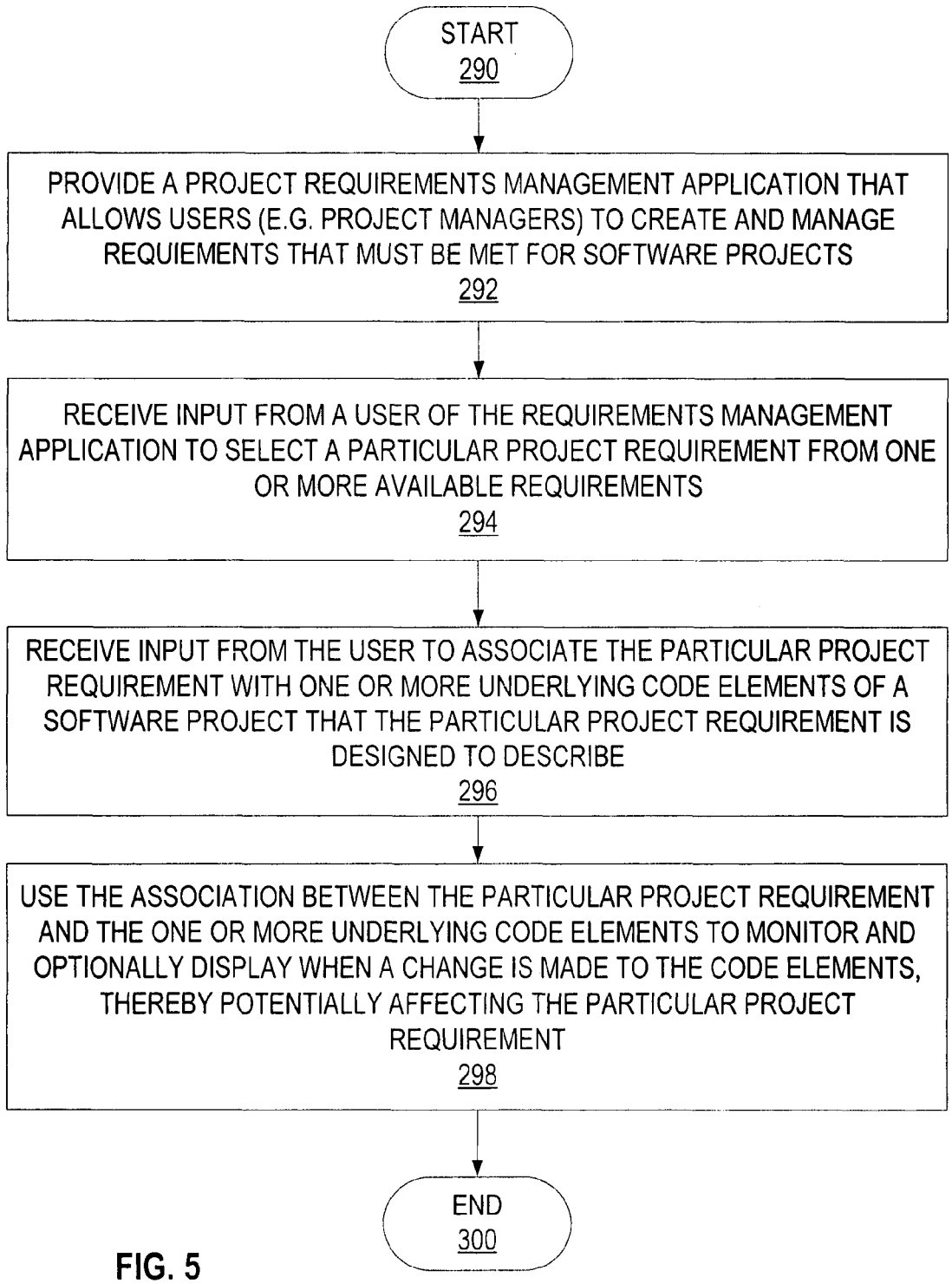
FIG. 5 is a process flow diagram for one implementation of the system of FIG. 1 that illustrates the stages involved in allowing a user of a requirements management tool to associate requirements with code elements.

FIG. 5 illustrates one implementation of the stages involved in allowing a user of a requirements management tool to associate requirements with code elements. In one form, the process of FIG. 5 is at least partially implemented in the operating logic of computing device 600 (of FIG. 15). The process begins at start point 290 with providing a project requirements management application that allows project managers to create and manage requirements that must be met for software projects (stage 292). Input is received from a user of the requirements management application to select a particular project requirement from one or more available requirements (stage 294). Input is received from the user to associate the particular project requirement with one or more underlying code elements of a software project that the particular project requirement is designed to describe (stage 296). The association between the particular project requirement and the one or more underlying code elements is used to monitor and optionally display when a change is made to the code elements, thereby potentially affecting the particular project requirement (stage 298). The process ends at end point 300.

Figure 6:
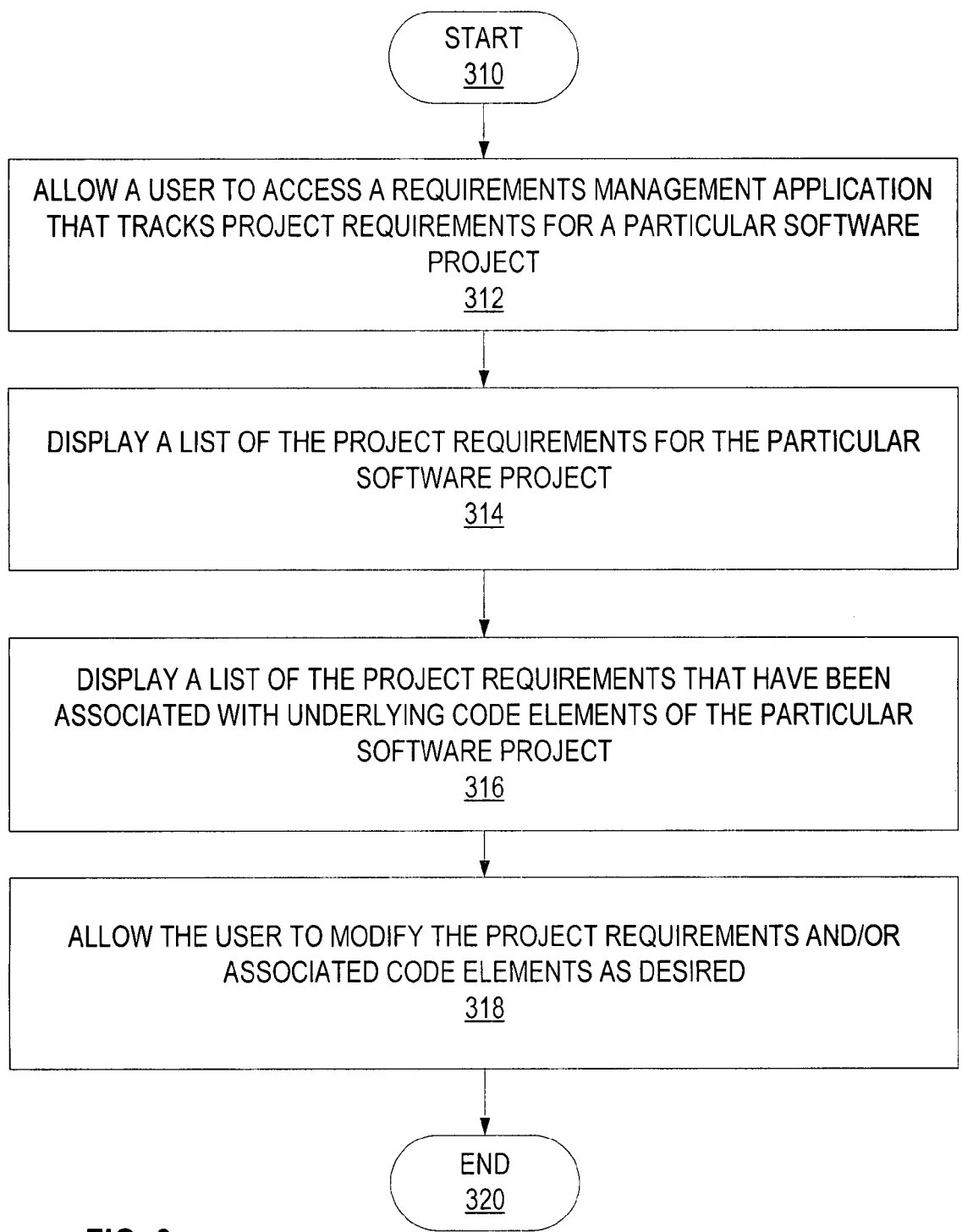
FIG. 6 is a process flow diagram for one implementation of the system of FIG. 1 illustrating the stages involved in allowing a user of a requirements management application to see which requirements are associated with which code elements.

FIG. 6 illustrates one implementation of the stages involved in allowing a user of a requirements management application to see which requirements are associated with which code element. In one form, the process of FIG. 6 is at least partially implemented in the operating logic of computing device 600 (of FIG. 15). The process begins at start point 310 with allowing a user to access a requirements management application that tracks project requirements for a particular software project (stage 312). A list of the project requirements for the particular software project is displayed (stage 314). A list of the project requirements that have been associated with underlying code elements of the particular software project is displayed (stage 316). The user can modify the project requirements and/or associated code elements as desired (stage 318). The process ends at end point 320.

Figure 7:
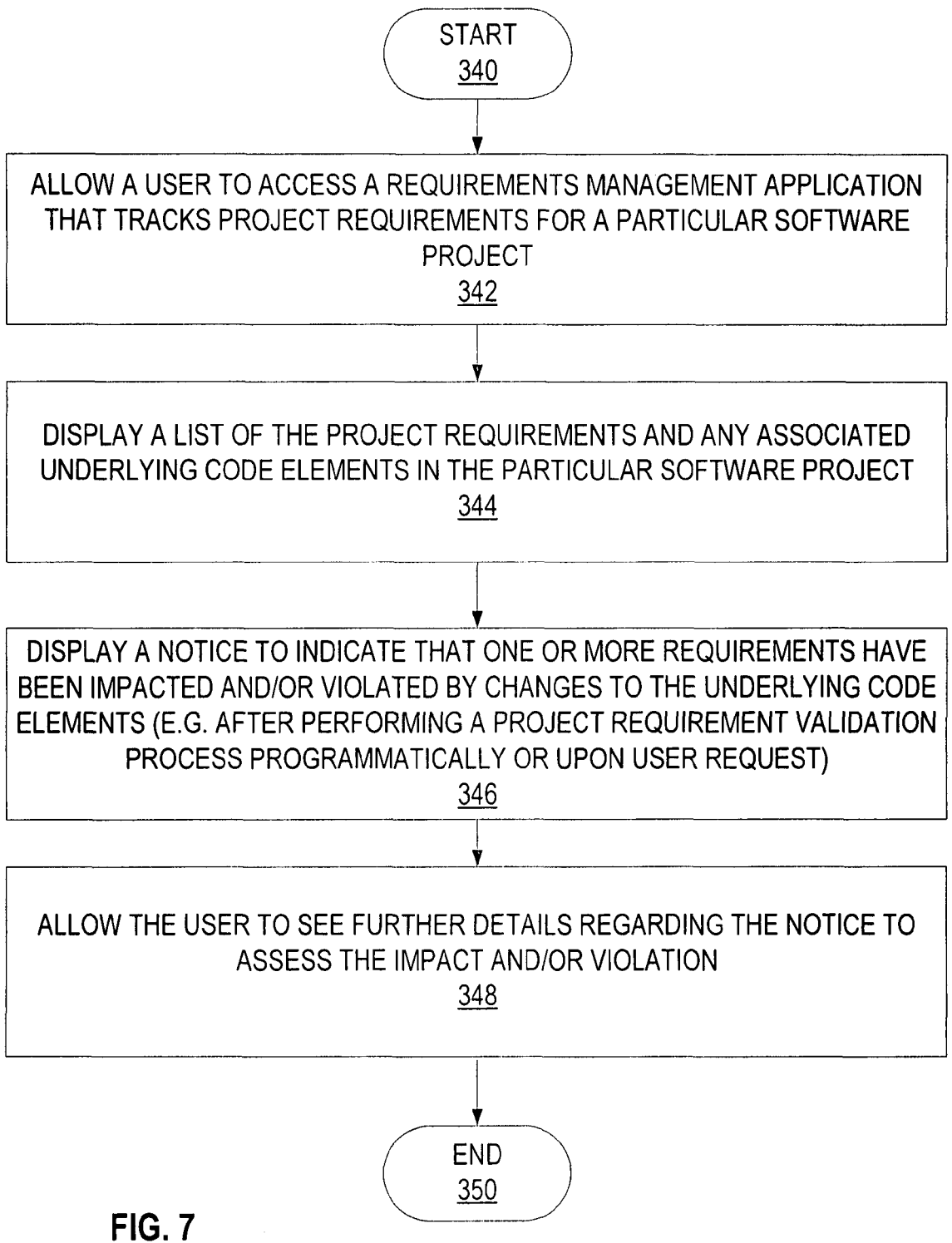
FIG. 7 is a process flow diagram for one implementation of the system of FIG. 1 that illustrates the stages involved in allowing a user of a requirements management application to see requirements that have been impacted and/or violated by changes in the underlying code elements.

FIG. 7 illustrates one implementation of the stages involved in allowing a user of a requirements management application to see requirements that have been impacted and/or violated by changes in the underlying code elements. In one form, the process of FIG. 7 is at least partially implemented in the operating logic of computing device 600 (of FIG. 15). The process begins at start point 340 with allowing a user to access a requirements management application that tracks project requirements for a particular software project (stage 342). The system displays a list of the project requirements and any associated underlying code elements in the particular software project (stage 344). A notice is displayed to indicate that one or more requirements have been impacted and/or violated by changes to the underlying code elements (e.g. after performing a project requirement validation process programmatically or upon user request) (stage 346). The user can view further details regarding the notice to assess the impact and/or violation (stage 348). The process ends at end point 350.

Figure 8:
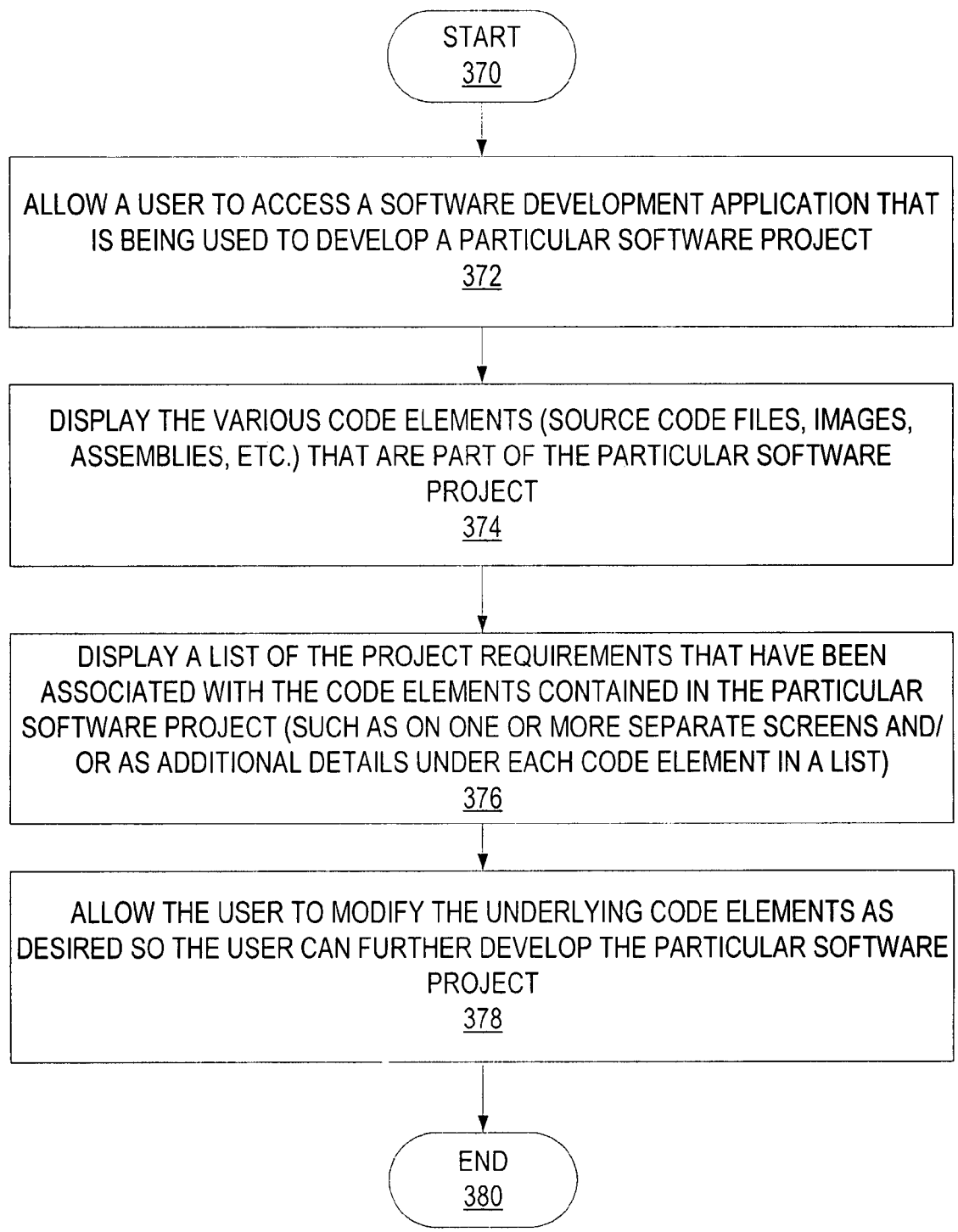
FIG. 8 is a process flow diagram for one implementation of the system of FIG. 1 illustrating the stages involved in allowing a user of a software development application to see which requirements are associated with which code elements.

FIG. 8 illustrates one implementation of the stages involved in allowing a user of a software development tool to see which requirements are associated with which code elements. In one form, the process of FIG. 8 is at least partially implemented in the operating logic of computing device 600 (of FIG. 15). The process begins at start point 370 with allowing a user to access a software development application that is being used to develop a particular software project (stage 372). The system displays the various code elements (source code files, images, assemblies, etc.) that are part of the particular software project (stage 374). The system displays a list of the project requirements that have been associated with the code elements contained in the particular software project (such as on one or more separate screens and/or as additional details under each code element in a project explorer or other list) (stage 376). The user can modify the underlying code elements as desired so the user can further develop the particular software project (stage 378). The process ends at end point 380.

Figure 9:
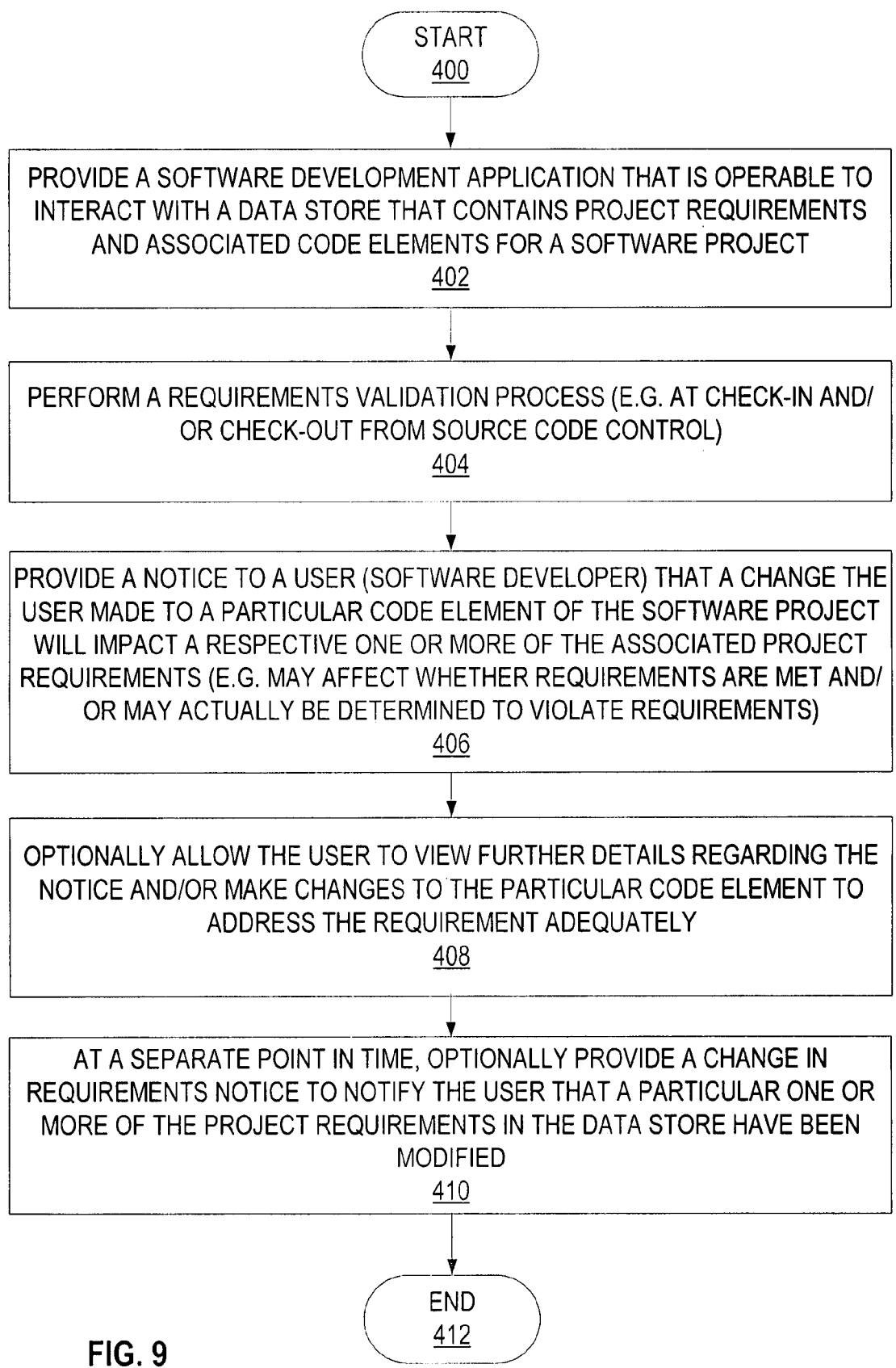
FIG. 9 is a process flow diagram for one implementation of the system of FIG. 1 that illustrates the stages involved in notifying a user of a software development tool that a requirement will be impacted based upon a change being made to code elements.

FIG. 9 illustrates one implementation of the stages involved in notifying a user of a software development tool that a requirement will be impacted based upon a change being made to code elements. In one form, the process of FIG. 9 is at least partially implemented in the operating logic of computing device 600 (of FIG. 15). The process begins at start point 400 with providing a software development application that is operable to interact with a data store that contains project requirements and associated code elements for a software project (stage 402). In one implementation, associations between the project requirements and code are maintained in the data store as the code evolves. A requirements validation process is performed (e.g. at check-in and/or check-out from source code control, etc.) (stage 404). A notice is provided to a user (software developer) that a change the user made to a particular code element of the software project will impact a respective one or more of the associated project requirements (e.g. may affect whether requirements are met and/or may actually be determined to violate requirements) (stage 406). As one non-limiting example, if code element A is associated with requirement Z, and a developer then later writes code element B which uses A, the system knows that changes in B can affect the ability to satisfy requirement Z and can notify the developer accordingly. The user can optionally view further details regarding the notice and/or make changes to the particular code element to address the requirement adequately (stage 408). At a separate point in time, optionally provide a change in requirements notice to notify the user that a particular one or more of the project requirements in the data store have been modified (stage 410). The process ends at end point 412.

Figure 10:
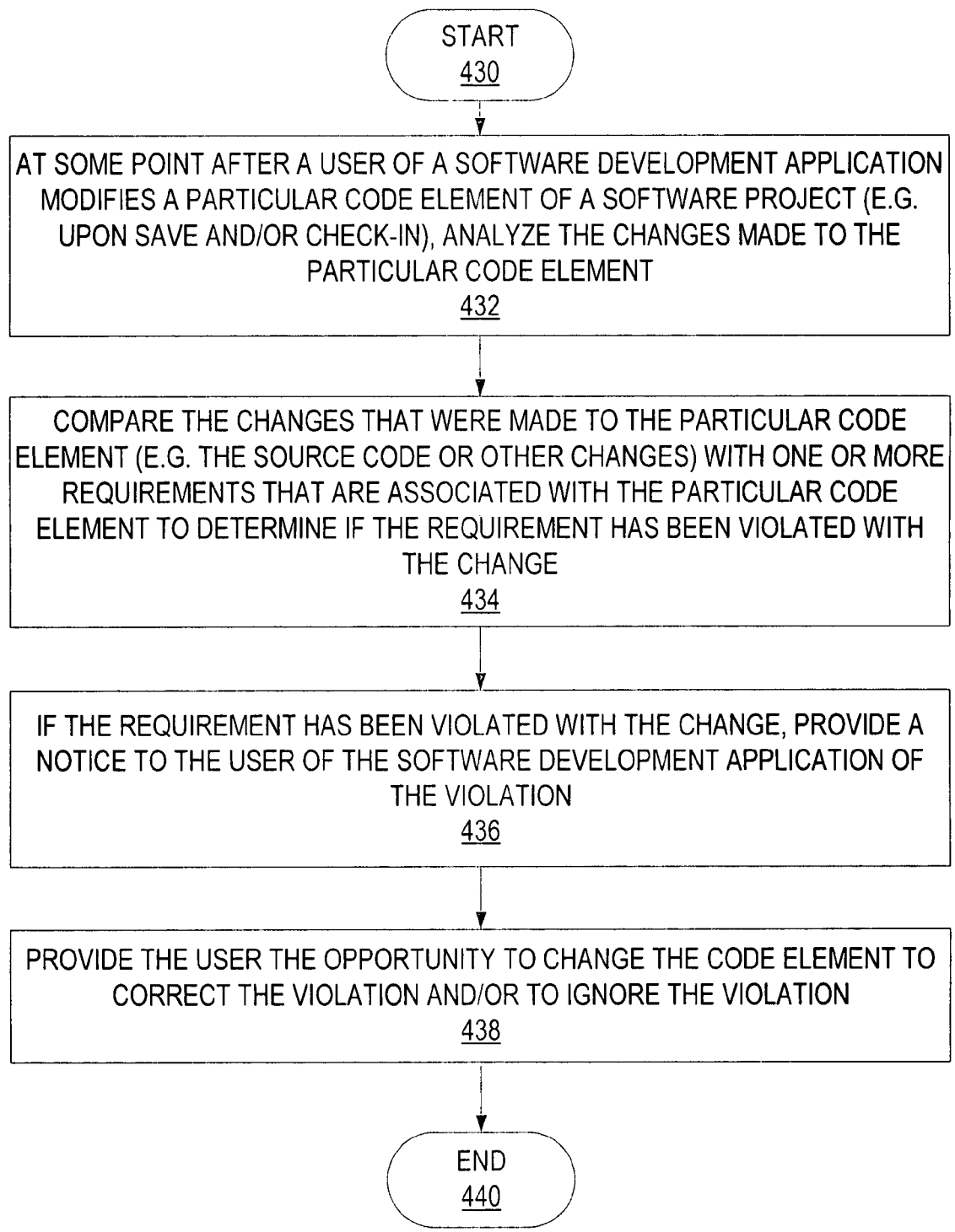
FIG. 10 is a process flow diagram for one implementation of the system of FIG. 1 that illustrates the stages involved in evaluating a change made to a code element to see if it violates a project requirement.

FIG. 10 illustrates one implementation of the stages involved in evaluating a change made to a code element to see if it violates a project requirement. In one form, the process of FIG. 10 is at least partially implemented in the operating logic of computing device 600 (of FIG. 15). The process begins at start point 430 with analyzing the changes made to the particular code element at some point after a user of a software development application modifies a particular code element of a software project (e.g. upon save and/or check-in) (stage 432). The changes that were made to the particular code element (e.g. the source code or other changes) are compared with one or more requirements that are associated with the particular code element to determine if the requirement has been violated with the change (stage 434). For example, suppose the requirement is that all buttons on a particular form have a particular green background. The code behind the particular form is analyzed to see if the required shade of green was actually used for the button. If the requirement has been violated with the change, a notice is provided to the user of the software development application of the violation (stage 436). The user is provided with the opportunity to change the code element to correct the violation and/or to ignore the violation (stage 438). The process ends at end point 440.

Turning now to FIGS. 11-14, simulated screens are shown to illustrate various user interfaces that can be displayed in a requirements management application 200 and/or software development application 230. These screens can be displayed to users on output device(s) 111. Furthermore, these screens can receive input from users from input device(s) 112.

Figure 11:
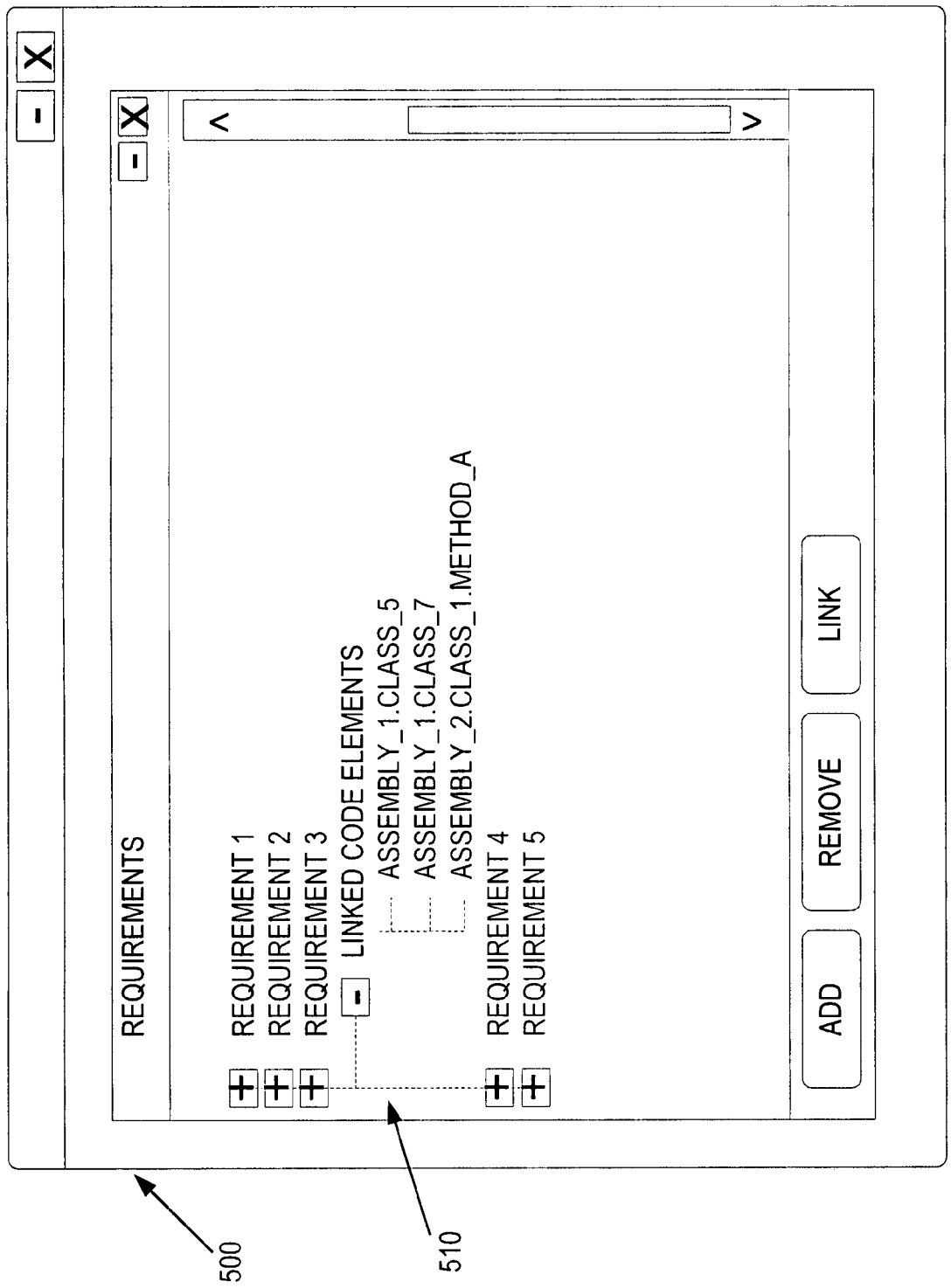
FIG. 11 show a simulated screen for one implementation that illustrates the list of requirements for a solution.
Figure 12:
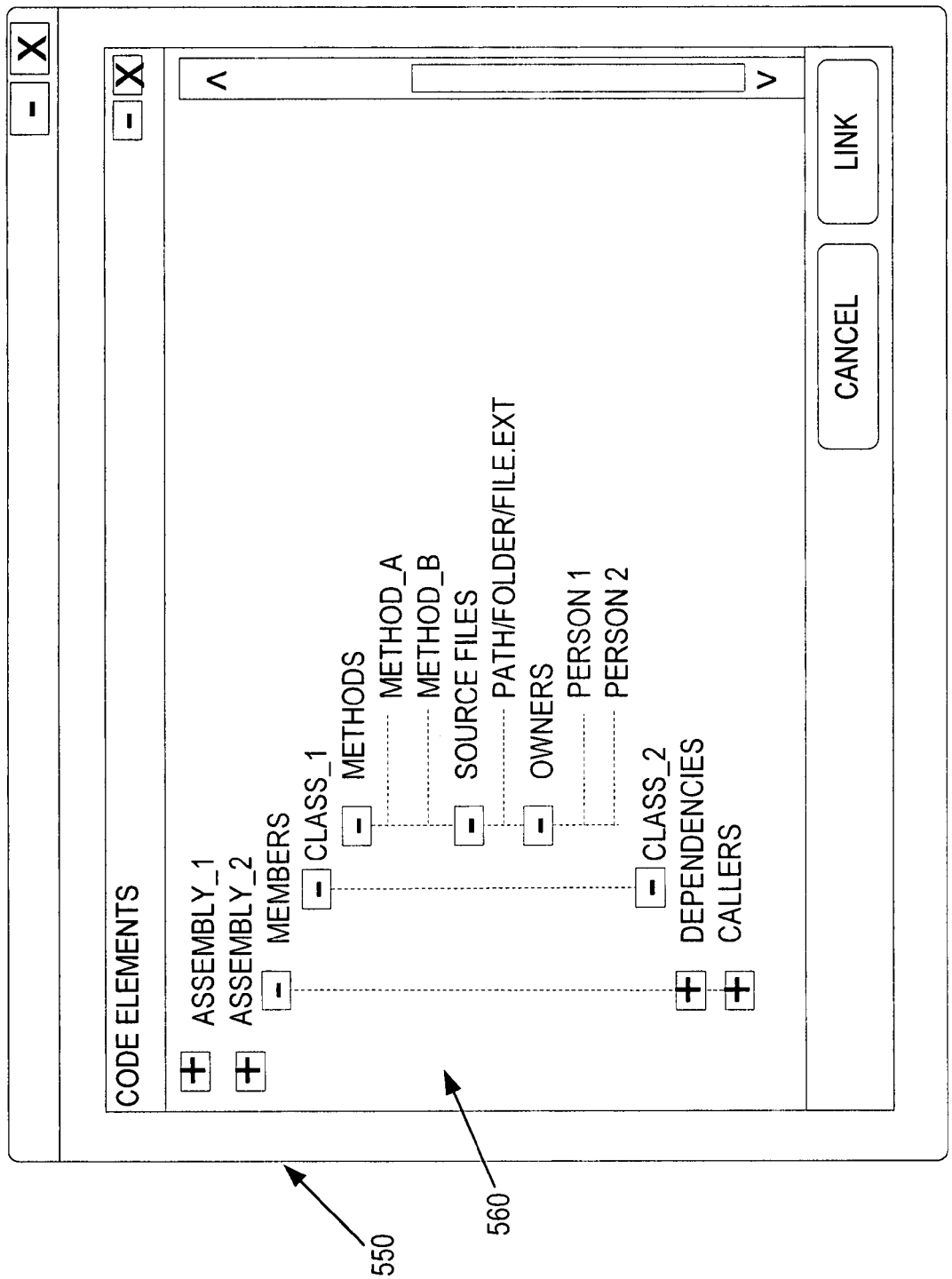
FIG. 12 is a simulated screen for one implementation that illustrates a list of available code elements to which a requirement may be linked.

FIG. 11 show a simulated screen 500 for one implementation that illustrates the list of requirements for a solution and the code elements 510 that have been associated with those particular requirements. FIG. 12 is a simulated screen 550 for one implementation that illustrates a list of available code elements 560 for a particular software project to which a requirement may be associated. In one implementation, the simulated screens of FIGS. 11 and 12 are displayed to a user of requirements management application 200 to allow that user to associate requirements with underlying code elements of a solution. These or similar screens could alternatively or additionally be displayed in different applications as appropriate. For example, a screen similar to FIG. 12 could be used to allow a user such as a developer to view the connection between the code that they are working on and the dependencies for that code (e.g. both the requirements and other code elements).

Figure 13:
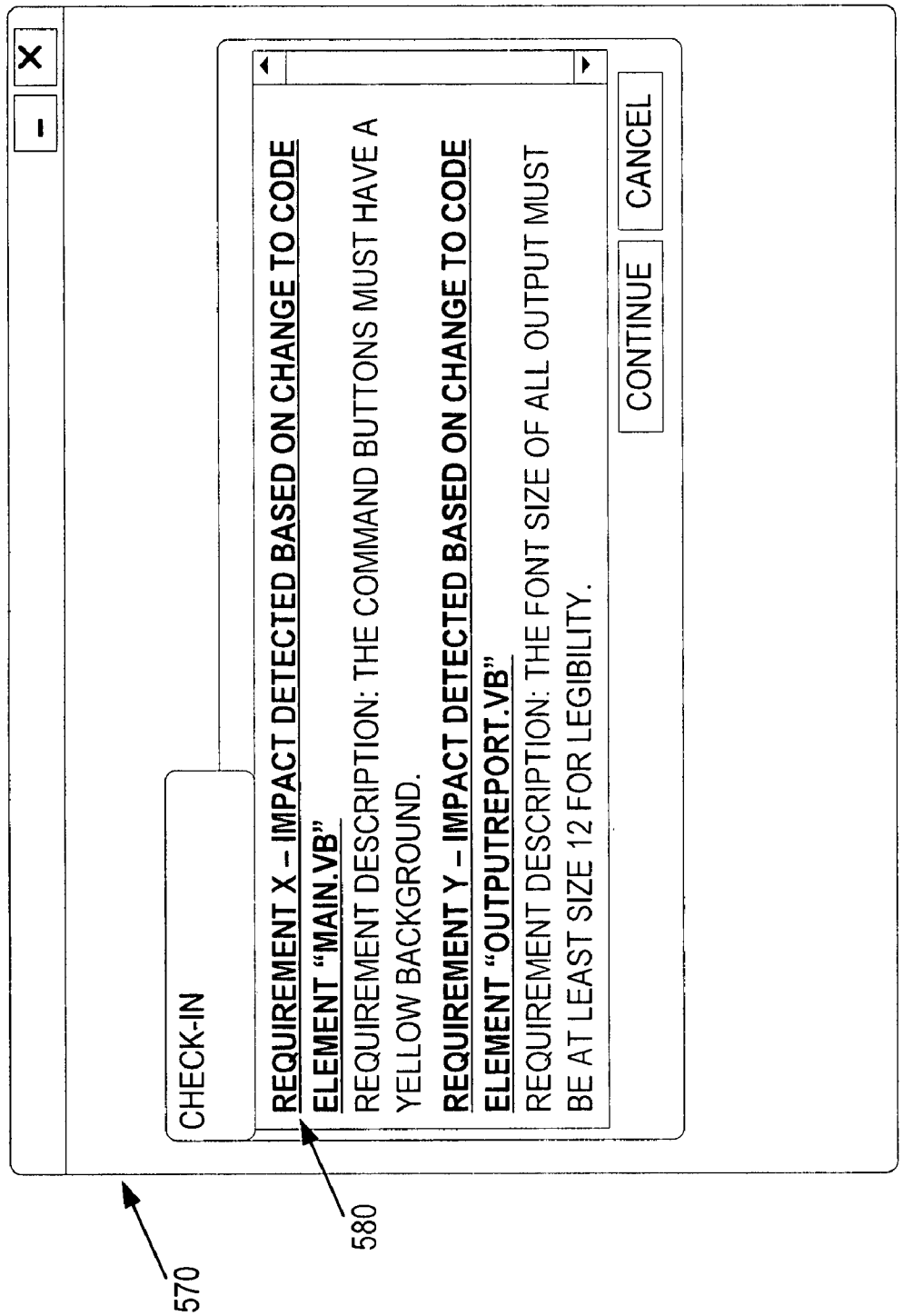
FIG. 13 show a simulated screen for one implementation that illustrates a notice being displayed to a software developer at check-in to indicate that the changes made to the code may impact certain requirements.

FIG. 13 show a simulated screen 570 for one implementation that illustrates a notice 580 being displayed to a software developer at check-in to indicate that the changes made to the code may impact certain requirements. The notice lists two different requirements that are tied to respective code elements. In this example, the user has changed the two respective code elements, and thus the system is displaying which project requirements have been associated with those respective code elements. This puts the user on notice that they may need to review those requirements in further detail to make sure their changes do not violate that requirement. A short or long description of the requirement is optionally displayed for the user's convenience.

Figure 14:
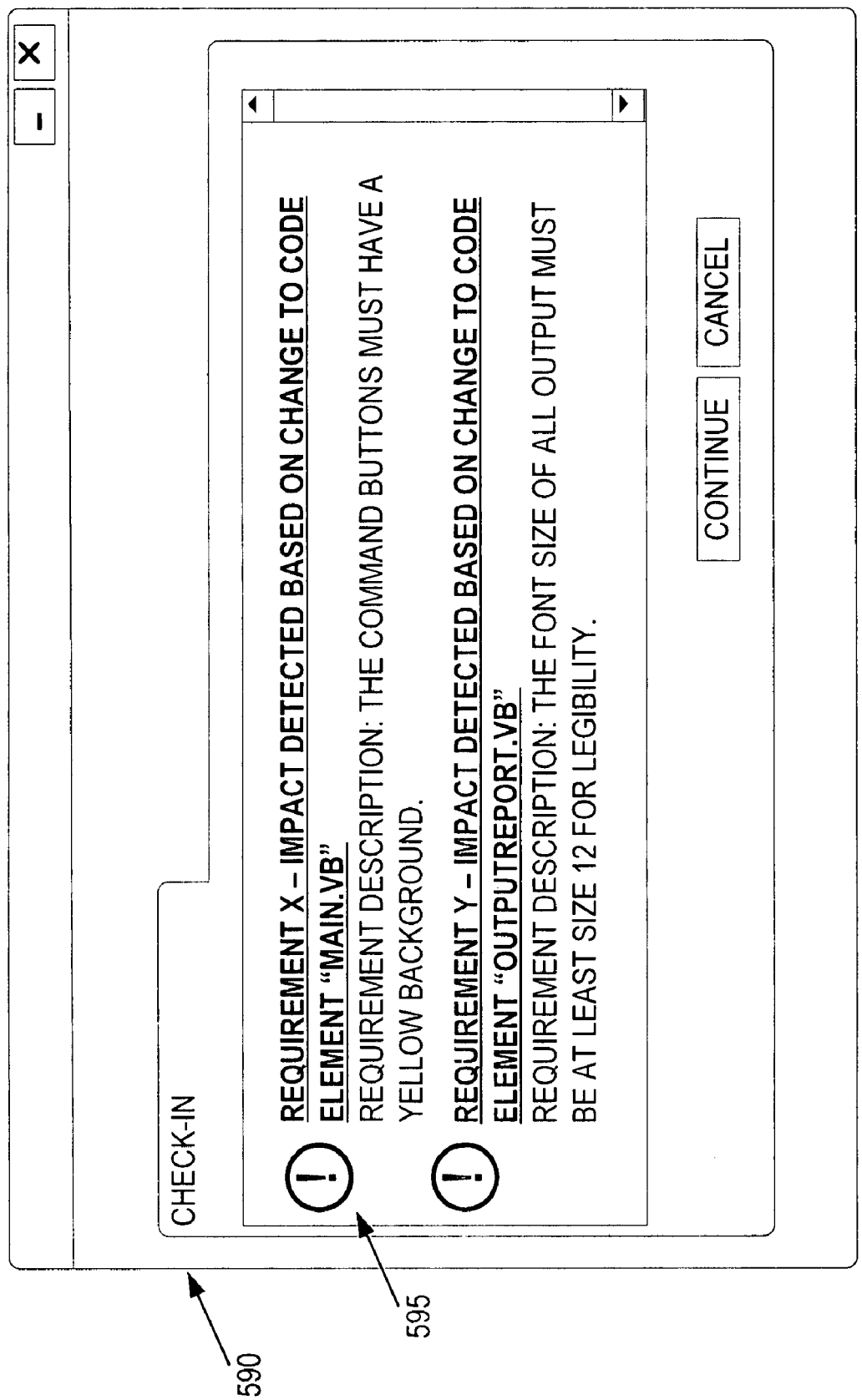
FIG. 14 is a simulated screen for one implementation that illustrates a warning notice being displayed to a software developer at check-in to indicate that the changes made to the code have been determined to violate certain requirements.

FIG. 14 is a simulated screen 590 for one implementation that illustrates a warning notice 595 being displayed to a software developer at check-in to indicate that the changes made to the code have been determined to violate certain requirements. In this example, the system was actually able to analyze the underlying changes to the source code to determine that the changes violate the requirements. The user is then notified with this warning that the change causes a requirements violation. The user can then continue with the save and/or check-in, or the user can cancel to return to the project and fix the problem to meet the requirements.

FIG. 15 is an exemplary computer system to use for implementing one or more parts of the system that includes a computing device, such as computing device 600. In its most basic configuration, computing device 600 typically includes at least one processing unit 602 and memory 604. Depending on the exact configuration and type of computing device, memory 604 may be volatile (such as RAM), non-volatile (such as ROM, flash memory, etc.) or some combination of the two. This most basic configuration is illustrated in FIG. 15 by dashed line 606. Requirements management application 200, software development application 230, and or other applications could operate on a computing device that has characteristics like computing device 600. In one implementation, different computers devices 600 are used to implement different aspects of the systems described herein. In other implementations, a single computing device 600 is used to implement different aspects of the system described herein.

Additionally, device 600 may also have additional features/functionality. For example, device 600 may also include additional storage (removable and/or non-removable) including, but not limited to, magnetic or optical disks or tape. Such additional storage is illustrated in FIG. 15 by removable storage 608 and non-removable storage 610. Computer storage media includes volatile and nonvolatile, removable and non-removable media implemented in any method or technology for storage of information such as computer readable instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 600. Any such computer storage media may be part of device 600.

Computing device 600 includes one or more communication connections 614 that allow computing device 600 to communicate with other computers/applications 615. Device 600 may also have input device(s) 612 such as keyboard, mouse, pen, voice input device, touch input device, etc. Output device(s) 611 such as a display, speakers, printer, etc. may also be included. These devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method executed by a processor for notifying a user that changes to source code will impact project requirements comprising the steps of:
    providing a software development application, the software development application being operable to interact with a data store that contains project requirements for a software project and any associated source code that is related to one or more of the project requirements of the software project;
    receiving input from a user to select the one or more of the project requirements;
    receiving input from a user to associate the one or more of the project requirements with one or more underlying code elements of a software project that the one or more of the project requirements are designed to describe;
    using the association between the one or more of the project requirements and the one or more underlying code elements to monitor when a change is made to the one or more underlying code elements; and
    providing a notice to a user that the change made to the one or more underlying code elements of the software project impacts the one or more of the project requirements that are related to the one or more underlying code elements.

2. The method of claim 1, wherein the notice is provided when the user to whom the notice is provided checks in one or more portions of the software project into a source code control application.

3. The method of claim 1, wherein the notice is provided when the user to whom the notice is provided checks out one or more portions of the software project from a source code control application.

4. The method of claim 1, wherein the notice indicates that changes to the one or more underlying code elements may affect whether the one or more project requirements that are associated with the one or more underlying code elements are met.

5. The method of claim 1, wherein the notice indicates that at least a portion of the one or more project requirements that are associated with the one or more underlying code elements have been violated with changes that have been made to the one or more underlying code elements.

6. The method of claim 1, wherein the user to whom the notice is provided is a software developer.

7. The method of claim 1, wherein the one or more of the project requirements are associated with the one or more underlying code elements of the software project from a project requirements management application.

8. The method of claim 1, further comprising:
at a separate point in time, providing a change in requirements notice to notify the user to whom the notice is provided that a particular one or more of the project requirements in the data store have been modified.

9. A computer-readable storage medium, not consisting of signals, having computer-executable instructions for causing a computer to perform the steps recited in claim 1.

10. A computer-readable storage medium, not consisting of signals, having computer-executable instructions for causing a computer to perform steps comprising:
analyze a particular software project to generate a list of source code files contained in the particular software project;
receive input from a user to select one or more project requirements;
receive input from the user to associate the one or more project requirements to one or more of the source code files; and
store the one or more project requirements and an association with the one or more source code files in a data store for retrieval by a project requirement validation process that is operable to display a notice indicating which of the one or more project requirements are affected by changes to the one or more source code files.

11. The computer-readable medium of claim 10, further having computer executable instructions for causing a computer to perform the step comprising:
analyze the data store to display a list of project requirements for the particular software project, along with the associated one or more source code files.

12. The computer-readable medium of claim 10, wherein the project requirement validation process is operable to display a notice indicating that a particular one or more project requirements have been violated due to changes to one or more of the associated source code files.

13. The computer-readable medium of claim 10, wherein the project requirement validation process is operable to analyze changes that have been made to the one or more source code files and to identify which of the one or more project requirements have been violated by the changes.

14. The computer-readable medium of claim 10, wherein the project requirement validation process is operable to display the notice indicating which of the one or more project requirements are affected by changes to the one or more source code files in response to a user checking in one or more portions of the software project into a source code control application.

15. A method executable by a processor for associating project requirements with underlying source code comprising the steps of:
receiving input from a user of a project requirements management application to select a particular project requirement from one or more available project requirements;
receiving input from the user of the project requirements management application to associate the particular project requirement with underlying source code of a software project that the particular project requirement is designed to describe;
using the association between the particular project requirement and the underlying source code to monitor when a change is made to the underlying source code, thereby potentially affecting the particular project requirement; and
providing a notification regarding the change.

16. The method of claim 15, wherein the notification indicates the particular project requirement may have been affected by change, and that an impact of the change on the particular project requirement should be further investigated.

17. The method of claim 15, wherein prior to providing the notification, a requirement validation process analyzes the change and determines that the change violates the particular project requirement.

18. The method of claim 17, wherein the notification indicates that the change violates the particular requirement.

19. The method of claim 15, wherein the user is a project manager who is responsible for managing a plurality of requirements that must be met for the software project.

20. A computer-readable storage medium, not consisting of signals, having computer-executable instructions for causing a computer to perform the steps recited in claim 15.

* * * * *